United States Patent [19]

Ohori et al.

[11] Patent Number: 5,057,261
[45] Date of Patent: Oct. 15, 1991

[54] PROCESS FOR PRODUCING MODIFIED ULTRAHIGH-MOLECULAR-WEIGHT POLYOLEFINS

[75] Inventors: Yoshiji Ohori; Hirofumi Harazoe, both of Waki, Japan

[73] Assignee: Mitsui Petrochemical Industries, Ltd., Tokyo, Japan

[21] Appl. No.: 431,833

[22] Filed: Nov. 6, 1989

Related U.S. Application Data

[62] Division of Ser. No. 219,574, Jul. 15, 1988, Pat. No. 4,927,871.

[30] Foreign Application Priority Data

Jul. 17, 1987 [JP] Japan .................... 62-177227

[51] Int. Cl.$^5$ .................... D01F 6/04; D01D 1/04
[52] U.S. Cl. .................... 264/210.6; 264/210.8; 264/211; 264/211.13; 264/211.16; 264/211.19; 264/211.12; 264/211.21; 264/211.22; 264/211.23; 264/210.4; 264/232; 264/340
[58] Field of Search .................... 264/211, 210.8, 210.6, 264/211.22, 211.24, 211.13, 211.14, 211.16, 210.3, 210.4, 211.12, 211.19, 211.21, 211.23, 232, 340

[56] References Cited

FOREIGN PATENT DOCUMENTS

| 0173572 | 5/1986 | European Pat. Off. . |
| 0229477 | 7/1987 | European Pat. Off. . |
| 3615408 | 2/1957 | Japan . |
| 396384 | 4/1961 | Japan . |
| 60-268356 | 11/1985 | Japan . |
| 61-57604 | 3/1986 | Japan . |

*Primary Examiner*—Hubert C. Lorin
*Attorney, Agent, or Firm*—Sherman and Shalloway

[57] ABSTRACT

A process for producing a modified ultrahigh-molecular-weight polyolefin composition, which comprises mixing a powder of an ultrahigh-molecular-weight polyolefin (A) having an intrinsic viscosity of at least 5 dl/g, a flowability improver (B) having a melting point lower than the melting point of the ultrahigh-molecular-weight polyolefin (A), a monomer (C) having an olefinically unsaturated bond and a radical initiator (D) with stirring at the melting point of the flowability improver (B) or a higher temperature but below the melting point of the ultrahigh-molecular-weight polyolefin (A), and then melt-kneading them at the melting point of the ultrahigh-molecular-weight polyolefin (A) or a higher temperature to react the monomer (C) with the ultrahigh-molecular-weight polyolefin (A).

2 Claims, 2 Drawing Sheets

PROCESS FOR PRODUCING MODIFIED ULTRAHIGH-MOLECULAR-WEIGHT POLYOLEFINS

This is a division of application Ser. No. 07/219,574, filed July 15, 1988, now U.S. Pat. No. 4,927,871.

BACKGROUND OF THE INVENTION

1. Field of the Invention

This invention relates to a modified ultrahigh-molecular-weight polyolefin having excellent stretch-moldability, and to a process for producing a stretch-molded article of the modified polyolefin.

2. Description of the Prior Art

It has already been known to produce molecularly oriented molded articles having high modulus and tensile strength by molding ultrahigh-molecular-weight polyolefins into fibers, tapes and other articles and stretching them. For example, Japanese Laid-Open Patent Publication No. 15408/1961 discloses that a dilute solution of an ultrahigh-molecular-weight polyolefin is spun and the resulting filaments are stretched.

However, a stretched article of such ultrahigh-molecular-weight polyethylene like that of general-purpose polyethylene is non-polar, and has poor adhesion to another substance. Thus, even when it is used as a reinforcing material, its properties are unlikely to be fully utilized.

On the other hand, for improvement of the adhesion of a nonpolar polymer such as polyethylene, modification of polyethylene by mixing it with an unsaturated carboxylic acid derivative such as maleic anhydride under heat (Japanese Patent Publication No. 6384/1964) is a best known method. Even if this method is applied to ultrahigh-molecular-weight polyethylene, it is difficult to graft-modify in an extruder or the like because it has an extremely high molecular weight unlike general-purpose polyethylene and has a high melt-viscosity. Furthermore, since polyethylene undergoes a crosslinking reaction at the time of graft modification, modified ultrahigh-molecular-weight polyethylene that might be obtained by such a method will further increase in molecular weight, and partly undergo gellation. Consequently, it is hardly possible to spin and stretch such a modified ultrahigh-molecular-weight polyethylene.

In an attempt to eliminate these defects, the present applicants previously proposed a method which comprises melt-kneading ultrahigh-molecular-weight polyethylene and an unsaturated carboxylic acid as one monomer having an olefinic unsaturated bond with a specific aliphatic hydrocarbon compound (Japanese Laid-Open Patent Publication No. 57604/1986), and a method which comprises kneading ultrahigh-molecular-weight polyethylene, a silane compound, a radical initiator and a diluent (Japanese Patent Application No. 268356/1985). These methods can prevent gellation in an extruding stage. However, when ultrahigh-molecular-weight polyethylene is mixed with an ethylenically unsaturated monomer and then melt-kneaded, the uniformity of an extrudate obtained from the kneaded mixture is unsatisfactory and this causes various defects such as reduced operability in spinning, and filament breakage in the subsequent stretching operation.

SUMMARY OF THE INVENTION

It is an object of this invention therefore to provide a process for producing an ultrahigh-molecular-weight polyolefin composition graft-modified with an ethylenically unsaturated monomer, which is free from gellation or composition non-uniformity and has excellent operability in molding and stretching.

Another object of the invention is to provide a process for producing a modified ultrahigh-molecular-weight polyolefin composition which has a uniform dispersed state and a homogeneous composition, contains the ultrahigh-molecular-weight polyolefin in a high concentration, and can be extruded and stretched.

Still another object of the invention is to provide a process for producing a stretch-molded article of a modified ultrahigh-molecular-weight polyolefin having excellent strength, high modulus and excellent adhesion to resins and rubbers.

According to this invention, there is provided a process for producing a modified ultrahigh-molecular-weight polyolefin composition, which comprises mixing a powder of an ultrahigh-molecular-weight polyolefin (A) having an intrinsic viscosity $[\eta]$ of at least 5 dl/g, a flowability improver (B) having a melting point lower than the melting point of the ultrahigh-molecular-weight polyolefin (A), a monomer (C) having an olefinically unsaturated bond and a radical initiator (D) with stirring at the melting point of the flowability improver (B) or a higher temperature but below the melting point of the ultrahigh-molecular-weight polyolefin (A), and then melt-kneading them at the melting point of the ultrahigh-molecular-weight polyolefin (A) or a higher temperature to react the monomer (C) with the ultrahigh-molecular-weight polyolefin (A).

According to this invention, there is also provided a process for producing a stretch-molded article of a graft-modified ultrahigh-molecular-weight polyolefin composition, which comprises mixing 5 to 80% by weight of a powder having a particle diameter of 1 to 500 μm of an ultrahigh-molecular-weight polyolefin having an intrinsic viscosity $[\eta]$ of 5 to 30 dl/g, 20 to 95% by weight of a normally solid flowability improver (B) having a melting point 20°–70° C. lower than the melting point of the ultrahigh-molecular-weight polyolefin (A), 0.1 to 20 parts by weight, per 100 parts by weight of the ultrahigh-molecular-weight polyolefin (A), of a monomer (C) selected from the group consisting of ethylenically unsaturated carboxylic acids, derivatives of the carboxylic acids, ethylenically unsaturated epoxy monomers and ethylenically unsaturated silane monomers, and 0.01 to 5 parts by weight, per 100 parts by weight of the ultrahigh-molecular-weight polyolefin (A), of a radical initiator (D) at the melting point of the flowability improver (B) or a higher temperature but below the melting point of the ultrahigh-molecular-weight polyolefin (A) to form a dispersion in which the flowability improver (B) forms the dispersion medium and the ultrahigh-molecular-weight polyolefin (A) forms the disperse phase, the monomer (C) and the radical initiator (D) exist dissolved or uniformly dispersed in the dispersion medium, and the ultrahigh-molecular-weight polyolefin (A) exists swollen with the flowability improver (B);

melt-kneading the dispersion at the melting point of the ultrahigh-molecular-weight polyolefin (A) or a higher temperature;

extruding the melt-kneaded mixture through a die to form an extruded article;

stretching the extruded article; and removing the flowability improver (B) from the molded article before, during or after the stretching.

DETAILED DESCRIPTION OF THE PREFERRED EMBODIMENTS

Figure 1:
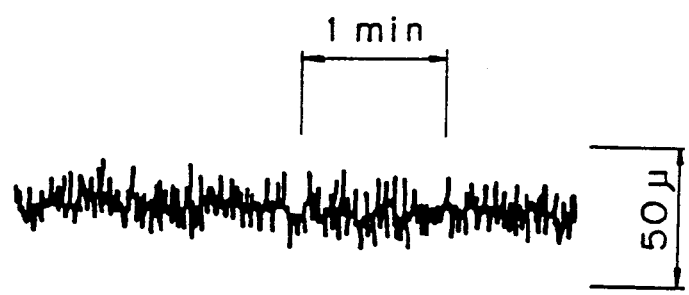
FIG. 1 is a diagram showing variations of the diameter of a filament at the time of spinning the modified ultrahigh-molecular-polyolefin in the process of this invention (Example 1)

The present invention is based on the finding that by first forming a dispersion in which a powder of the ultrahigh-molecular-weight polyolefin (A) is dispersed as particles in a continuous dispersion medium of the flowability improver (B), particularly a normally solid flowability agent, and the ethylenically unsaturated monomer (C) and the radical initiator (D) are dissolved or uniformly dispersed in the dispersion medium, and thereafter melt-kneading the dispersion, a composition can be obtained which contains the ultrahigh-molecular-weight polyolefin (A) in a high concentration and in which the state of dispersion of the ultrahigh-molecular-weight polyolefin (A) in the flowability improver (B) is very fine (homogeneous) and uniform and the grafting of the ethylenically unsaturated monomer is effected uniformly.

Because the concentration of the ultrahigh-molecular-weight polyolefin (A) is high, the composition of this invention brings about the advantage that the efficiency of extrusion and the productivity are high. Furthermore, since the state of mixing and dispersion between the component (A) and the components (B), (C) and (D) is very homogeneous and uniform, grafting of the monomer to the ultrahigh-molecular-weight polyolefin (A) is effected uniformly. Another advantage is that a molded article having a constant filament diameter can be obtained because the graft-modified product and the flowability improver (B) show a homogeneous mixed state. Accordingly, the composition of this invention has excellent moldability, and moreover the molded article has excellent stretchability and can be stretched to a high extent to give a stretch-molded article having high strength and modulus.

The stretch-molded article formed from the composition of this invention brings about the unexpected advantage that the decrease of the molecular weight of the ultrahigh-molecular-weight polyolefin is not remarkable. For example, a molded article obtained by using a uniform solution of the ultrahigh-molecular-weight polyolefin as a starting material, graft-modifying it and spinning and stretching the graft modified polyolefin decreases in [η] by about 15% or more from the [η] of the starting material. In contrast, in a stretch-molded article obtained by using the dispersion of this invention as the material, this decrease rate is not more than 14%, particularly not more than 10%, and even not more than 7%. The decrease rate (%) is defined by the following equation.

$$\text{Decrease rate (\%)} = \frac{\left(\begin{array}{c}(\eta) \text{ of the} \\ \text{starting} \\ \text{material}\end{array}\right) - \left(\begin{array}{c}(\eta) \text{ of the} \\ \text{modified} \\ \text{stretched} - \\ \text{molded article}\end{array}\right)}{(\eta) \text{ of the starting material}} \times 100$$

Accordingly, modified stretch-molded articles produced in accordance with this invention have higher thermal resistance and strength than those obtained in the prior art.

The ultrahigh-molecular-weight polyolefin (A) used in this invention has an intrinsic viscosity [η], measured in decalin at 135° C., of at least 5 dl/g, preferably 7 to 30 dl/g. If its intrinsic viscosity is less than 5 dl/g, a uniform mixture can be easily prepared, but since its molecular chain is short, high modulus and high strength tend to be difficult to obtain. There is no particular upper limit to the intrinsic viscosity. However, if it exceeds 30 dl/g, the melt viscosity of the polyolefin is excessively high even if the flowability improver (B) is added, and its extrudability tends to be inferior.

The ultrahigh-molecular-weight polyolefin used in this invention may be, for example, a homopolymer or a copolymer of an α-olefin such as ethylene, propylene, 1-butene, 1-pentene, 1-hexene, 1-octene, 1-decene and 4-methyl-1-pentene. Of these, a homopolymer of ethylene or a copolymer of a major proportion of ethylene with another alpha-olefin each having a high crystallinity is preferred because these polymers can lead to high modulus and high tensile strength.

The ultrahigh-molecular-weight polyolefin (A) used in the invention is in the form of a powder having a particle diameter of usually 1 to 500 μm, preferably 5 to 300 μm. If its particle diameter exceeds 500 μm, it is too large in size and is not likely to form a suspension having good dispersibility when it is mixed with the flowability improver (B).

The flowability improver (B) used in this invention is a low-molecular-weight compound having a lower melting point than the melting point of the ultrahigh-molecular-weight polyolefin (A). The flowability improver (B) may be, for example, solvents for the ultrahigh-molecular-weight polyolefin (A) or normally solid waxy substances having compatibility with the ultrahigh-molecular-weight polyolefin (A). The solvents preferably have boiling points higher than the melting point of the ultrahigh-molecular-weight polyolefin (A), preferably the melting point plus 20° C. Specific examples of the solvents include aliphatic hydrocarbon solvents such as n-nonane, n-decane, n-undecane, n-dodecane, n-tetradecane, n-octadecane, liquid paraffin and kerosene; aromatic hydrocarbons and their hydrogenated derivatives such as xylene, naphthalene, tetralin, butylbenzene, p-cymene, cyclohexylbenzene, diethylbenzene, pentylbenzene, dodecylbenzene, bicyclohexylbenzene, decalin, methylnaphthalene and ethylnaphthalene; halogenated hydrocarbons such as 1,1,2,2-tetrachloroethane, pentachloroethane, hexachloroethane, 1,2,3-trichloropropane, dichlorobenzene, 1,2,4-trichlorobenzene and bromobenzene; and mineral oils such as paraffinic process oils, naphthenic process oils and aromatic process oils.

Aliphatic hydrocarbon compounds and their derivatives may be used as the waxes. Desirably, the waxes have a melting point 20° to 70° C., especially 30° to 70° C., lower than the melting point of the ultrahigh-molecular-weight polyolefin (A).

The aliphatic hydrocarbon compounds are mainly saturated aliphatic hydrocarbon compounds which have a molecular weight of usually not more than 2,000, preferably not more than 1,000, more preferably not more than 800, and are called paraffinic waxes. Specific examples of these aliphatic hydrocarbon compounds include n-alkanes having at least 22 carbon atoms such as docasane, tricosane, tetracosane and triacontane, mixtures of these as a mojor component with lower n-alkanes, paraffinic waxes separated and purified from petroleum, low to medium pressure polyethylene waxes which are low-molecular-weight polymers obtained by polymerizing ethylene or copolymerizing ethylene with another α-olefin, high-pressure polyethylene waxes, ethylene copolymer waxes, waxes obtained by thermally degrading polyethylenes such as low, medium and high pressure polyethylenes thereby to lower their molecular weights, oxidation products of these waxes and maleic acid-modified waxes of these.

The aliphatic hydrocarbon derivatives may be, for example, fatty acids, aliphatic alcohols, fatty acid amides, fatty acid esters, aliphatic mercaptans, aliphatic aldehydes and aliphatic ketones having at least 8 carbon atoms, preferably 12 to 50 carbon atoms, and a molecular weight of 130 to 2000, preferably 200 to 800, which are compounds having at least 1, preferably 1 or 2, especially preferably 1, functional group such as a carboxyl, hydroxyl, carbamoyl, ester, mercapto or carbonyl group at the end or in the inside of the aliphatic hydrocarbon groups (alkyl or alkenyl group). Specific examples include capric acid, lauric acid, myristic acid, palmitic acid, stearic acid and oleic acid as the fatty acids, lauryl alcohol, myristyl alcohol, cetyl alcohol and stearyl alcohol as the aliphatic alcohols, caprinamide, lauriamide, palmitamide and stearamide as the fatty acid amides and stearyl acetate as the fatty acid esters.

Of these flowability improvers (B), normally solid waxy substances are preferred.

Hydrocarbon polymers having a softening point of as low as 50 to 120° C. may be added to the flowability improver (B) used in this invention if they do not impair the objects of the present invention. Specific examples are resins usually used as tackifying resins in adhesive tapes, paints and hot-melt adhesives. They include, for example, aliphatic hydrocarbon resins produced from a $C_4$ fraction and a $C_5$ fraction obtained by cracking of petroleum and naphtha, a mixture of these, or isoprene and 1,3-pentadiene in any of these fractions such as the $C_5$ fraction as a main material; aromatic hydrocarbon resins produced from styrene derivatives and indenes in a $C_9$ fraction obtained by cracking of petroleum or naphtha as a main material; aliphatic aromatic copolymerized hydrocarbon resins obtained by copolymerizing any of $C_4$ and $C_5$ fractions with a $C_9$ fraction; alicyclic hydrocarbon resins obtained by hydrogenating aromatic hydrocarbon resins; synthetic terpene hydrocarbon resins having an aliphatic, alicyclic and aromatic structure; terpene hydrocarbon resins produced from α, β-pinene in a terpene oil as a main material; coumarone-indene hydrocarbon resins produced from indenes and styrenes in coal tar-type naphtha as a material; low-molecular-weight styrene resin and rosin-type hydrocarbon resins.

The monomer (C) having an olefinically unsaturated bond used in this invention may be any monomer having in the molecule an olefinically unsaturated bond, which can be grafted to the ultrahigh-molecular-weight polyolefin (A) in the presence of the radical initiator (D). Preferably, the monomer may also contain another polar group, specically a functional group such as a carboxyl, acid halide, amide, imide, acid anhydride, ester, epoxy or alkoxysilane group, in addition to the olefinically unsaturated bond. Of these monomers, (C-1) unsaturated carboxylic acids or their derivatives, (C-2) unsaturated epoxy monomers and (C-3) silane monomers having an olefinically unsaturated bond.

Specific examples of the unsaturated carboxylic acids or their derivatives (C-1) include unsaturated dicarboxylic acids such as acrylic acid, methacrylic acid, α-ethylacrylic acid, maleic acid, fumaric acid, itaconic acid, citraconic acid, tetrahydrophthalic acid, methyl-tetrahydrophthalic acid, endocis-bicyclo 2.2.1-hept-5-ene-2,3-dicarboxylic acid (Nadic Acid ®) and methyl-endocis-bicyclo 2.2.1 hept-5-ene-2,3-dicarboxylic acid (Methyl Nadic Acid ®); and derivatives of these unsaturated dicarboxylic acids such as their acid halides, amides, imides, acid anhydrides and esters, specifically malenyl chloride, maleimide, maleic anhydride, citraconic anhydride, monomethyl maleate and dimethyl maleate. Of these, the unsaturated dicarboxylic acids or their anhydrides are preferred. Maleic acid and Nadic Acid and their anhydrides are especially preferred.

The unsaturated epoxy monomer (C-2) denotes a monomer having at least one polymerizable unsaturated bond and at least one epoxy group per molecule. For example, it includes unsaturated glycidyl esters of the following general formula

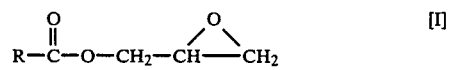

in which R is a hydrocarbon group having a polymerizable ethylenically unsaturated bond, unsaturated glycidyl ethers of the following general formula

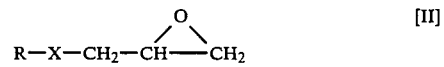

in which R is as defined in formula [I], and X is a divalent group represented by —CH₂ or

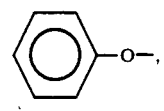

and epoxyalkenes represented by the following general formula

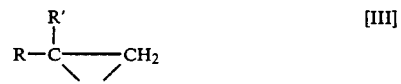

in which R is as defined in [I], and R' is a hydrogen atom or a methyl group.

Specific examples of the unsaturated epoxy monomer (C-2) include glycidyl acrylate, glycidyl methacrylate, monoglycidyl itaconate, diglycidyl itaconate, mono-, di-and triglcidyl butenetricarboxylates, mono- and di-glycidyl tetraconates, mono- and di-glycidyl esters of endo-cis-bicyclo 2.2.1 hept-5-ene-2,3-dicarboxylic acid (Nadic Acid®), mono- and di-glycidyl esters of methylendo-cis-bicyclo 2.2.1 hept-5-ene-2,3-dicarboxylic acid (Methyl Nadic Acid®), mono- and di-glycidyl allylsuccinates, glycidyl p-styrenecarboxylate, allyl glycidyl ether, 2-methylallyl glycidyl ether, styrene-p-glycidyl ether, 3,4-epoxy-3-methyl-1-butene, 3,4-epoxy-1-pentene, 3,4-epoxy-3-methyl-1-pentene, 5,6-epoxy-1-hexene and vinylcyclohexene monoxide. Of these, glycidyl acrylate and glycidyl methacrylate are preferred.

The silane monomer (C-3) having an olefinically unsaturated bond is not particularly limited, and is suitably a silane monomer having a hydrolyzable organic group in addition to the olefinically unsaturated bond. Examples are compounds having the general formulae $R^1R^2SiY^1Y^2$, $R^1XSiY^1Y^2$ and $R^1SiY^1Y^2Y^3$. In the formulae, $R^1$ and $R^2$ are monovalent groups having an olefinically unsaturated bond and consisting of carbon and hydrogen and optionally oxygen, and may be identical or different.

Examples of such groups are vinyl, allyl, butenyl, cyclohexenyl and cyclopentadienyl. Especially preferred are those olefinically unsaturated at the terminals. Other preferred examples may include $CH_2=C(CH_2)COO(CH_2)_3-$, $CH_2=C(CH_2)COO(CH_2)_3-O-(CH_2)_3-$ and $CH_2=C(CH_2)COOCH_2OCH_2CH_2(OH)CH_2O(CH_2-)_3-$ which have an ester linkage of a terminal unsaturated acid. The vinyl group is most preferred.

X represents an organic group not containing an olefinically unsaturated bond, and includes, for example, methyl, ethyl, propyl, tetradecyl, octadecyl, phenyl, benzyl and tolyl groups which are monovalent hydrocarbon groups. These groups may be halogen-substituted hydrocarbon groups.

The groups $Y^1$, $Y^2$ and $Y^3$ are identical or different hydrolyzable groups, and examples include alkoxy groups such as methoxy, ethoxy, butoxy and methoxyethoxy, alkoxyalkoxy groups, acyloxy groups such as formyloxy, acetoxy and propionoxy, oxime groups such as $-ON=C(CH_2)_2$, $-ON=CHCH_2C_2H_5$ and $-ON=C(C_6H_5)_2$, and substituted amino groups and arylamino groups such as $-NHCH_3$, $-NHC_2H_5$ and $-NH(C_6H_5)$.

Silane monomers preferably used in this invention are compounds represented by the general formula $R^1SiY^1Y^2Y^3$. Those in which the groups $Y^1$, $Y^2$ and $Y^3$ are identical are especially suitable. Of these, vinyltrisalkoxysilanes are most suitable. Examples are vinyltrimethoxysilane, vinyltriethoxysilane and vinyltris(methoxyethoxy)silane. Vinylmethyldiethoxysilane and vinylphenyldimethoxysilane may equally be used.

The radical initiator (D) may be any of radical initiators which are used in the grafting treatment of the type shown in this invention, for example organic peroxides and organic peresters. Specific examples include benzoyl peroxide, dichlorobenzoyl peroxide, dicumyl peroxide, di-tert-butyl peroxide, 2,5-di(peroxy benzoate)-hexyl-3, 1,4-bis(tert-butylperoxyisopropyl)-benzene, lauroyl peroxide, tert-butyl peracetate, 2,5-dimethyl-2,5-di(tert-butylperoxy)hexyne-3, 2,5-dimethyl-2,5-di(-tert-butylperoxy)hexane, tert-butyl perbenzoate, tert-butyl perphenylacetate, tert-butyl isobutyrate, tert-butyl per-sec-octoate, tert-butyl perpivalate, cumyl perpivalate and tert-butyl perdiethylacetate. Azo compounds such as azobisisobutryronitrile and dimethyl azoisobutyrate may also be used.

To perform the grafting effectively under the melt-kneading conditions of the ultrahigh-molecular-weight polyolefin (A), the radical initiator (D) desirably has a half-life temperature in the range of 100° to 200° C.

The amount of the powder of the ultrahigh-molecular-weight polyolefin (A) is usually 5 to 80% by weight, preferably 20 to 60% by weight, based on the total amount of the polyolefin and the flowability improver (B), and the amount of the flowability improver (B) is usually 20 to 95% by weight, preferably 40 to 80% by weight, on the same basis. The powder of the ultrahigh-molecular-weight polyolefin (A), even at temperatures below its melting point, absorbs the molten flowability improver (B) to some extent and swells. Hence, if the amount of the flowability improver (B) is less than 20% by weight, it might not be possible to secure flowability sufficient for achieving uniformity in mixing with stirring at an elevated temperature. Furthermore, the mixture has a high melt viscosity and tends to be difficult to extrude. On the other hand, if the amount of the flowability improver (B) exceeds 95% by weight, problems may arise in commercialization in regard to handling of a large amount of the flowability improver (B) and productivity.

The amount of the monomer (C) having an olefinically unsaturated bond used in this invention is generally 0.1 to 20 parts by weight, preferably 0.5 to 10 parts by weight, per 100 parts by weight of the ultrahigh-molecular-weight polyolefin (A). The amount of the radical initiator (D) is a catalytic amount, and is generally 0.01 to 5 parts by weight, preferably 0.02 to 0.5 part by weight, per 100 parts by weight of the ultrahigh-molecular-weight polyolefin (A). If the amount of the monomer (C) is below the lower limit specified above, the amount of the monomer (C) grafted is too small and the improving effect contemplated by the invention tends to be difficult to obtain. On the other hand, if it exceeds the upper limit specified, the formation of a homopolymer of the monomer (C) occurs markedly, and the grafting efficiency of the monomer tends to decrease.

The process of this invention comprises mixing the ultrahigh-molecular-weight polyolefin (A) powder, the flowability improver (B), the monomer (C) and the radical initiator (D) with stirring at the melting point of the flowability improver or a higher temperature but below the melting point of the ultrahigh-molecular-weight polyolefin (A), and then melt-kneading the mixture at the melting point of the ultrahigh-molecular-weight polyolefin (A) or a higher temperature, thereby reacting the monomer (C) with the ultrahigh-molecular-weight polyolefin (A). In mixing the powdery ultrahigh-molecular-weight polyolefin (A), the flowability improver (B), the monomer (C), and the radical initiator (D), predetermined amounts of the ingredients are mixed, then the mixture is heated to the melting point of the flowability improver (B) or a higher temperature but below the melting point of the ultrahigh-molecular-weight polyolefin (A) to melt the flowability improver (B), and the ingredients are mixed with stirring. It is also possible to put the powdery ultrahigh-molecular-weight polyolefin (A), the monomer and the radical initiator (D) in the flowability improver (B) melted in advance, and mixing them with stirring. If the temperature of the system during mixing with stirring is below the melting point of the flowability improver (B), the mixing is solid-solid mixing and the dispersibility of the ingredients is poor. On the other hand, if the temperature of the system is the melting point of the ultrahigh-molecular-weight polyolefin (A) or higher, the polyolefin is melted and the viscosity of the system rises abruptly so that the system is difficult to stir. The temperature ($T_1$) of the system during mixing the powdery ultrahigh-molecular-weight polyolefin (A) and the flowability improver (B) and the other ingredients is preferably the melting point of the flowability improver (B)+10° C. to the melting point of the ultrahigh-molecular-weight polyolefin (A)−20° C.

When a normally solid flowability improver is used, the temperature ($T_1$) at which to form the dispersion is preferably such that its viscosity is 1 to 50 centipoises, particularly 1 to 20 centipoises.

The mixing with stirring may be carried out by using an ordinary stirring vessel or a stationary mixer, for example, so long as the mixture is maintained in the aforesaid state. The mixing may be carried out continuously or batchwise.

After the powdery ultrahigh-molecular-weight polyolefin (A), the flowability improver (B) and the other ingredients have been mixed with stirring, the resulting mixture (dispersion) is melt-kneaded at the melting point of the ultrahigh-molecular-weight polyolefin (A) or a higher temperature. As a result, the monomer (C) is reacted with the ultrahigh-molecular-weight polyolefin (A).

The mixture of the powdery ultrahigh-molecular-weight polyolefin (A) and the flowability improver (B) is a low-viscosity dispersion in which the powdery ultrahigh-molecular-weight polyolefin (A) swollen slightly as a result of absorbing the molten flowability improver (B) is dispersed in the molten flowability improver (B). Hence, a twin-screw extruder, or a single-screw extruder having a cylinder subjected to a screw-like surface roughening treatment is preferably used as means for melt-kneading the mixture (dispersion). A twin-screw extruder in which the cylinders are adapted to rotate in the same direction is especially preferred because it has good extrusion stability and self-cleaning property. If a simple fulflighted single-screw extruder is used, surging may occur. Usually, the twin-screw extruder or other melt-kneading means is prescribed at a temperature ranging from the melting point of the flowability improver (B) to a temperature below the melting point of the ultrahigh-molecular-weight polyolefin (A) in the feed section, and at a temperature ranging from the melting point of the ultrahigh-molecular-weight polyolefin (A) to a temperature below the decomposition temperature of the ultrahigh-molecular-weight polyolefin (A) in the mixing section. If the temperature of the feed section is below the melting point of the flowability improver (B) the flowability improver (B) solidifies and adheres to, and grows at, the inlet of the extruder. As a result, the inlet flow passage is narrowed and the supply of the mixture is liable to become unstable. The same phenomenon is likely to occur when the temperature of the feed section is above the melting point of the ultrahigh-molecular-weight polyolefin (A). The preferred temperature prescribed is from the melting point of the ultrahigh-molecular-weight polyolefin (A)−40° C. to the melting point of the ultrahigh-molecular-weight polyolefin (A)−10° C. at the feed section; and the melting point of the polyolefin (A)+20° C. at a first conveying section. The residence time of the mixture in the twin-screw extruder or the other kneading means is usually 0.3 to 30 minutes. If it is less than 0.3 minute, the mixture is unlikely to be melt-kneaded completely. On the other hand, if it exceeds 30 minutes, the molecular weight of the ultrahigh-molecular-weight polyolefin (A) is likely to be reduced.

After the powdery ultrahigh-molecular-weight polyolefin (A), the flowability improver (B), and the other ingredients have been melt-kneaded, the kneaded mixture is fed into a die of a desired shape to form a uniform filament, sheet, T-die film, pipe, rod, tape, inflation film or another molded article.

The melt-extruded article such as a filament, sheet, T-die film, pipe, rod, tape or inflation film has excellent stretchability because the ultrahigh-molecular-weight polyolefin (A) is homogeneously dispersed in the flowability improver (B). A stretched molded article of the ultrahigh-molecular-weight polyolefin having high modulus and high tensile strength can be easily produced by stretching the molded article at a temperature below the melting point of the ultrahigh-molecular-weight polyolefin (A) and removing the flowability improver from the molded article before, during or after the stretching.

The stretching operation may be carried out by the dry method or the wet method in one or a plurality of stages. The suitable stretching temperature is a temperature below the melting point of the stretched article under restraining, and at least 90° C., preferably at least 100° C. The stretch ratio is from 6 to 50, especially from 10 to 30. Good stretchability can be maintained and the flowability improver (B) can be removed, by carrying out the stretching operation in a solvent incapable of dissolving the ultrahigh-molecular-weight polyolefin (A) but capable of dissolving the flowability improver (B).

The stretched molded article obtained by this invention may be subjected to any known after-treatments. For example, if the monomer (C) is an ethylenically unsaturated silane, it is possible to impregnate the molded article with a silanol condensation catalyst during or after the stretching and to contact the stretched molded article with moisture, thereby performing crosslinking. The silanol condensation catalyst may be, for example, a dialkyltin dicarboxylate such as dibutyltin dilaurate, an organic titanate such as tetrabutyl titanate, or lead naphthenate, and is used in a catalytic amount. The crosslinking treatment may be carried out by contacting the stretched molded article with moisture at a temperature of 50° to 130° C. for a period of 3 to 24 hours.

Additives usually added to polyolefins, such as heat stabilizers, weather stabilizers, pigments, dyes and inorganic fillers may be added during the mixing of the powdery ultrahigh-molecular-weight polyolefin (A), the flowability improver (B) and the other ingredients in amounts which do not impair the objects of this invention.

Since in the process of this invention, the monomer having an olefinically unsaturated bond and the radical initiator are uniformly mixed with stirring with a slurry of the ultrahigh-molecular-weight polyolefin powder in which a solution or melt of the flowability improver exists as a continuous phase, and then the mixture is melt-kneaded to react the monomer with the polyolefin, A modified ultrahigh-molecular-weight polyolefin to which the monomer is grafted uniformly can be produced. In addition, because the flowability improver is uniformly dispersed, the resulting modified ultrahigh-molecular-weight polyolefin has excellent stretchability and moldability. By taking advantage of these characteristics, the resulting modified ultrahigh-molecular-weight polyolefin composition can be easily molded into, for example, highly oriented fibers having high modulus, high strength and good adhesion.

The following Examples illustrate the present invention in greater detail. It should be understood that the invention is not limited to these specific examples unless it departs from the scope of the invention described and claimed herein.

EXAMPLE 1

Grafting and Spinning

A powder of ultrahigh-molecular-weight polyethylene ($[\eta]=7.42$ dl/g, average particle diameter=200 μm) was put in paraffin wax (Luvax, a tradename for a product of Nippon Seirou: melting point 69° C.), melted and then maintained at 100° C. The mixture was then stirred for 10 minutes to form a dispersion in which the concentration of the polyethylene was 30% by weight.

Subsequently, 5 parts by weight of vinyltriethoxysilane (produced by Shin-etsu Chemical Co., Ltd.) and 0.05 parts by weight of 2,5-dimethyl-2,5-di(tert-butylperoxy)hexane (Perhexa 25B, a tradename for a product of Nippon Oils and Fats Co., Ltd.) per 100 parts by weight of the polyethylene were added to the resulting dispersion, and then they were mixed with stirring for 10 minutes to obtain a dispersion.

The dispersion was melt-kneaded with a residence time of 1.5 minutes at a screw rotating speed of 150 rpm by using a twin-screw extruder (made by Plastic Engineering Institute; the cylinders adapted to rotate in the same direction; screw diameter 39 mm; L/D=42). The feed section of the extruder was preset at a temperature of 100° C., and the other parts of the extruder, at 210° C.

Subsequently, the molten mixture was spun from a die having an orifice diameter of 2 mm to complete grafting of the silane monomer. The spun filament was cooled and solidified with air at room temperature with an air gap of 180 cm to form an unstretched filament of the silane-grafted ultrahigh-molecular-weight polyethylene. The unstretched filament had a size of 650 denier and the draft ratio during the sprinning was 31.4. The take-up speed of the filament at this time was 17.4 m/min.

Figure 2:
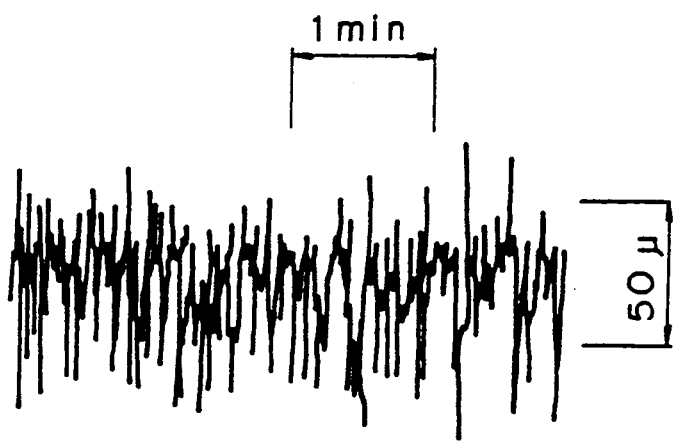
FIG. 2 is a diagram showing variations of the diameter of a filament at the time of spinning the modified product of Comparative Example 1.

To examine the stability of spinning, variations in the diameter of the filament during the spinning are shown in FIG. 1. The variations in filament diameter obtained in Comparative Example 1 to be given below are shown in FIG. 2. By comparison, it was found that the spinning stability in Example 1 was better, and a more uniform modified product was obtained, than in Comparative Example 1.

Determination of the Amount of the Silane Grafted

About 8 g of the unstretched grafted filament prepared by the above method was dissolved in 200 cc of p-xylene heated at 135° C. Then at room temperature, the ultrahigh-molecular-weight polyethylene was precipitated in an excess of hexane to remove the paraffin wax and the unreacted silane compound. Thereafter, the weight % of Si was determined by the weight method, and the amount of the silane compound grafted was found to be 0.30% by weight.

Stretching

The unstretched filament obtained by the above method was stretched in two stages by using three godet rollers in stretching vessels holding n-decane as a heat medium. The stretching temperature in a first vessel was 110° C., and the stretching temperature in a second vessel was 120° C. The effective length of each vessel was 50 cm. In performing the stretching, the rotating speed of a first godet roll was adjusted to 0.5 m/min, and by changing the rotating speed of a third godet roll, a filament of a desired stretch ratio was obtained. The rotating speed of a second godet roll was selected properly from a range in which the stretching could be performed stably. The stretch ratio, however, was calculated from the rotation ratio between the first godet roll and the third godet roll.

The filament obtained was dried at room temperature under reduced pressure to give a silane-grafted ultrahigh-molecular-weight polyethylene filament.

Impregnation of a Crosslinking Catalyst

To crosslink the silane-grafted ultrahigh-molecular-weight polyethylene filament, a mixture of n-decane as a heat medium and an equal amount of dibutyltin dilaurate was put in the second stretching vessel at the time of stretching, and the paraffin wax was extracted and simultaneously the dibutyltin dilaurate was impregnated in the filament. The filament obtained was dried at room temperature under reduced pressure until it did not give off a decane smell.

Crosslinking

Thereafter, the filament was left to stand for 12 hours in boiling water to complete the crosslinking.

Measurement of the Gel Fraction

About 0.4 g of the silane-crosslinked stretched polyethylene filament was put in an Erlenmeyer flask holding 200 ml of p-xylene and equipped with a condenser, and the contents of the flask were stirred for 4 hours in a boiling condition. The insoluble materials were removed by filtration through a 300-mesh stainless steel wire gauze, dried at 80° C. under reduced pressure, and weighted. The gel fraction is calculated in accordance with the following equation.

$$\text{Gel fraction} = \frac{\text{Weight of the insoluble materials}}{\text{Sample weight}} \times 100\ (\%)$$

The above prepared sample had a gel fraction of 92%.

Before the crosslinking, the stretched silane-grafted ultrahigh-molecular-weight polyethylene filament had a gel fraction of 0%, and no gel formation was noted during the grafting reaction.

The tensile modulus, tensile strength and elongation at break of the filament were measured at room temperature (23° C.) by a Instron universal tester (Model 1123 made by Instron Company). The sample length between clamps was 100 mm, and the pulling speed was 100 mm/min. The tensile modulus is an initial modulus. The sectional area of the filament required for calculation was determined by measuring the weight and length of the filament assuming that the density of the polyethylene was 0.96 g/cm$^3$.

The properties of the silane-crosslinked stretched polyethylene filament are shown in Table 1.

TABLE 1

| Properties | Sample 1 |
| --- | --- |
| Filament size | 16 denier |
| Stretch ratio | 12 |
| Strength | 1.5 Gpa |
| Modulus | 50 Gpa |
| Elongation | 4.0% |

The strength and modulus of the filament are superior to the results of Comparative Example 1 (Table 2).

COMPARATIVE EXAMPLE 1

Grafting and Spinning

One hundred parts by weight of powdery ultrahigh-molecular-weight polyethylene ($[\eta]=7.42$ dl/g, average particle diameter 200 μm), 235 parts of a powdery paraffin wax (Luvax, a tradename for a product of Nippon Seirou, melting point 69° C.), 5 parts by weight of vinyltriethoxysilane (a product of Shin-etsu Chemical Co., Ltd.) and 0.05 part by weight of 2,5-dimethyl-2,5-di(tert-butylperoxy)hexane (Perhexa 25B, a tradename for a product of Nippon Oils and Fats Co., Ltd.) were stirred at 1000 rpm for 1 minute by a Henschel mixer (made by Mitsui Miike Co., Ltd., 75$^L$) to form a powdery mixture.

The mixture was spun by using the same extruder and spinning device as in Example 1 under the same operating conditions to form an unstretched grafted ultrahigh-molecular-weight polyethylene filament having a size of 650 denier. The draft ratio during the spinning was 31.4.

Variations in the diameter of the filament during the spinning are shown in FIG. 2. These variations were greater than those in Example 1, and it was found that the spinning stability was inferior and the unformity of the filament was unsatisfactory.

Determination of the Amount of the Silane Grafted

The unstretched graft filament was analyzed in the same way as in Example 1, and it was found that the amount of the silane monomer grafted was 0.25% by weight.

Stretching

As in Example 1, the grafted unstretched filament spun from the ultrahigh-molecular-weight polyethylene mixture was stretched. Filament breakage occurred frequently during the stretching operation, and this method was found to be impracticable. The filament obtained with difficulty was dried at room temperature under reduced pressure to give a stretched silane-grafted ultrahigh-molecular-weight polyethylene filament.

Impregnation of a Crosslinking Catalyst and Crosslinking

Silane crosslinked ultrahigh-molecular-weight polyethylene was obtained in the same way as in Example 1.

Measurement of the Gel Fraction

The gel fraction of the silane crosslinked ultrahigh-molecular-weight polyethylene measured as in Example 1 was 93%. Before the crosslinking, the stretched silane-grafted ultrahigh-molecular-weight polyethylene filament had a gel fraction of 5%, and no gel formation was observed during the grafting reaction.

The properties of the crosslinked ultrahigh-molecular-weight polyethylene filament are shown in Table 2.

TABLE 2

| Properties | Sample 2 |
| --- | --- |
| Filament size | 16 denier |
| Stretch ratio | 13 |
| Strength | 1.3 Gpa |
| Modulus | 35 Gpa |
| Elongation | 3.7% |

EXAMPLE 2

Grafting and Spinning

As in Example 1, a paraffin wax dispersion in which the concentration of ultrahigh-molecular-weight polyethylene was 30% by weight was formed.

Five parts by weight of maleic anhydride (a product of Wako Pure Chemicals, Co., Ltd.) and 0.1 part by weight of 2,5-dimethyl-2,5-di(t-butylperoxy)hexane (Perhexa 25B, a tradename for a product of Nippon Oils and Fats Co., Ltd.), per 100 parts by weight of the ultrahigh-molecular-weight polyethylene, were added to the dispersion, and they were mixed with stirring for 10 minutes to form a dispersion.

The dispersion was then melt-kneaded with a residence time of 1.5 minutes at a screw rotating speed of 150 rpm by using a twin-screw extruder (made by Plastic Engineering Institute; the cylinders adapted to rotate in the same direction; screw diameter 39 mm; L/D=42). The feed section of the extruder was preset at a temperature of 100° C., and the other parts of the extruder, at 230° C.

Subsequently, the molten mixture was spun from a die having an orifice diameter of 2 mm to complete grafting of maleic anhydride. The spun filament was cooled and solidified with air at room temperature with an air gap of 180 cm to form an unstretched filament of the maleic anhydride-grafted ultrahigh-molecular-weight polyethylene. The unstretched filament had a size of 650 denier and the draft ratio during the sprinning was 31.4. The take-up speed of the filament at this time was 17.4 m/min.

Measurement of the Amount of Maleic Anhydride Grafted

About 8 g of the unstretched graft filament prepared by the above method was dissolved in 200 cc of p-xylene maintained at 135° C. Then, at room temperature, the ultrahigh-molecular-weight polyethylene was precipitated in an excess of hexane, and the paraffin was and the unreacted maleic anhydride were removed. The amount (% by weight) of maleic anhydride grafted was determined by infrared absorption spectroscopy, and found to be 0.61% by weight.

Stretching

In the same way as in Example 1, the unstretched filament was stretched to give a stretched maleic anhydride-grafted ultrahigh-molecular-weight polyethylene filament.

The properties of the resulting filament are shown in Table 3.

TABLE 3

| Properties | Sample 3 |
| --- | --- |
| Filament size | 16 denier |
| Stretch ratio | 12 |
| Strength | 1.5 Gpa |
| Modulus | 40 Gpa |
| Elongation | 5.9% |

Evaluation of Adhesion

Figure 3:
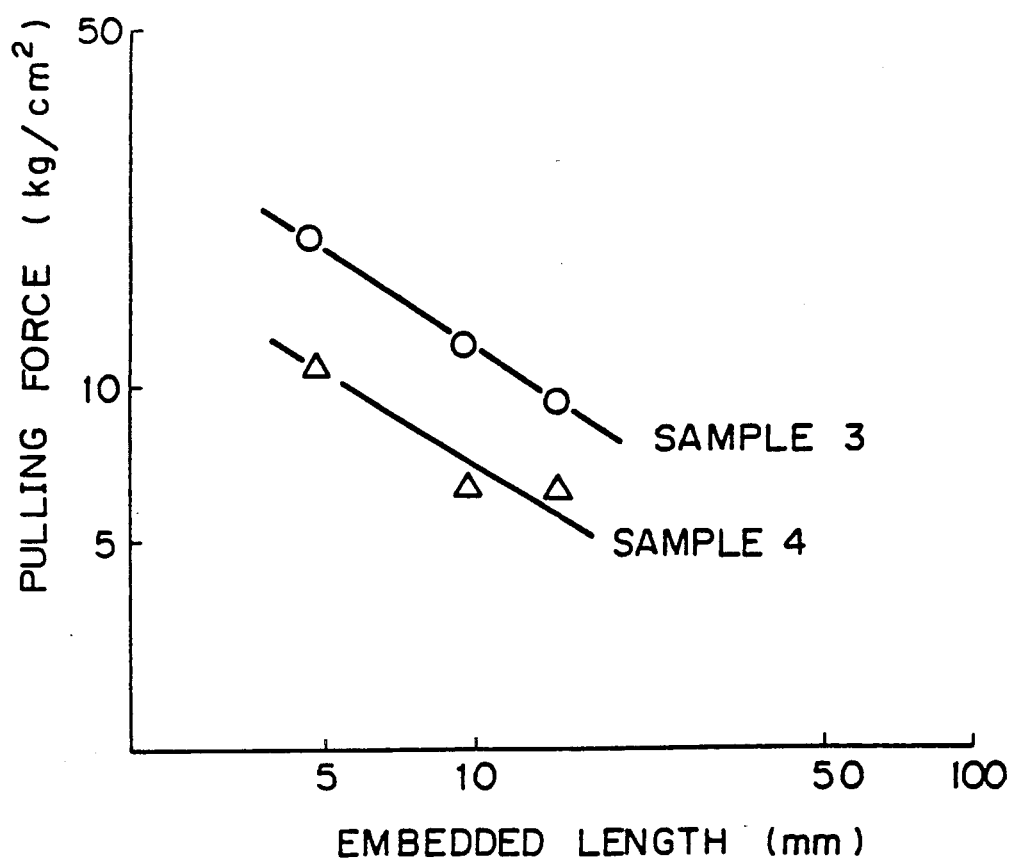
FIG. 3 is a graphic representation showing the relation between the embedded length and the pulling force in an adhesion test on the sample 3 of Example 2 and the sample 4 of Comparative Example 2.

Adhesion was evaluated by a pulling method. As a resin to which the filament is to be adhered, an epoxy resin "ARALDITE RAPID", now a product of Japenese Ciba Greigy k.k.) was used, and the adhesion of the filament was evaluated in accordance with Adhesion Strength Method A (P test) in the Method of Testing Synthetic Filament Tire Cords in JIS L-1017. The results are shown in FIG. 3. It can be seen that the stretched maleic anhydride-grafted ultrahigh-molecular-weight polyethylene filament prepared in this Example (sample 3) has about two times as high an adhesion strength (pulling force) as the stretched ultrahigh-molecular-weight polyethylene filament (sample 4) prepared in Comparative Example 2 below.

COMPARATIVE EXAMPLE 2

Preparation of a Stretched
Ultrahigh-Molecular-Weight Polyethylene Filament

A mixture of 100 parts by weight of powdery ultrahigh-molecular-weight polyethylene ($[\eta]=8.20$ dl/g) and 320 parts by weight of the same powdery paraffin as described in Example 1 was spun in the same way as in Example 1. At this time, the draft ratio was 25, and the resulting unstretched filament had a size of 1000 denier. The unstretched filament was stretched as in Example 1, and the properties of the resulting stretched filament are shown in Table 4.

TABLE 4

| Properties | Sample 4 |
| --- | --- |
| Filament size | 8.5 denier |
| Stretch ratio | 28.0 |
| Strength | 1.68 Gpa |
| Modulus | 45.5 Gpa |
| Elongation | 6.3% |

The adhesion strength of the filament was measured by the method described in Example 2 under the heading "Evaluation of Adhesion", and the result is shown in FIG. 3 together with that of Example 2.

We claim:

1. A process for producing a stretched molded article of a graft-modified ultrahigh-molecular-weight polyolefin composition, which comprises mixing 5 to 80% by weight of a powder having a particle diameter of 1 to 500 μm of an ultrahigh-molecular-weight polyolefin having an intrinsic viscosity $[\eta]$ of 5 to 30 dl/g, 20 to 95% by weight of a normally solid flowability improver (B) having a melting point 20°–70° C. lower than the melting point of the ultrahigh-molecular-weight polyolefin (A), 0.1 to 20 parts by weight, per 100 parts by weight of the ultrahigh-molecular-weight polyolefin (A), of a monomer (C) selected from the group consisting of ethylenically unsaturated carboxylic acids, derivatives of the carboxylic acids, ethylenically unsaturated epoxy monomers and ethylenically unsaturated silane monomer, and 0.01 to 5 parts by weight, per 100 parts by weight of the ultrahigh-molecular-weight polyolefin (A), of a radical initiator (D) at the melting point of the flowability improver (B) or a higher temperature but below the melting point of the ultrahigh-molecular-weight polyolefin (A) to form a dispersion in which the flowability improver (B) forms the dispersion medium and the ultrahigh-molecular-weight polyolefin (A) forms the disperse phase, the monomer (C) and the radical initiator (D) exist dissolved or uniformly dispersed in the dispersion medium, and the ultrahigh-molecular-weight polyolefin (A) exists swollen with the flowability improver (B);

melt-kneading the dispersion at the melting point of the ultrahigh-molecular-weight polyolefin (A) or a higher temperature;

extruding the melt-kneaded mixture through a die to form an extruded article;

stretching the extruded article; and removing the flowability improver (B) from the molded article before, during or after the stretching.

2. The process of claim 1 in which the monomer (C) is an ethylenically unsaturated silane monomer; and the silane monomer is crosslinked by impregnating the stretched molded article with a silane crosslinking catalyst and then contacting the molded article with moisture.

* * * * *